United States Patent [19]
Ito et al.

[11] 4,288,420
[45] Sep. 8, 1981

[54] REMOVAL OF NITROGEN OXIDES AND SULFUR OXIDES BY AMMONIA

[75] Inventors: Hayami Ito; Chiaki Nagai, both of Kobe; Yasuyuki Nakabayashi; Kihachiro Igarashi, both of Yokohama; Kunihiko Mouri, Yokosuka; Takashi Ikeda, Chigasaki, all of Japan

[73] Assignees: Electric Power Development Co. Ltd., Tokyo; Kawasaki Jukogyo Kabushiki Kaisha, Hyogo, both of Japan

[21] Appl. No.: 183,565

[22] Filed: Aug. 29, 1980

[30] Foreign Application Priority Data

Sep. 3, 1979 [JP] Japan .............................. 54-113430

[51] Int. Cl.$^3$ .............................................. B01D 53/36
[52] U.S. Cl. .................................... 423/239; 423/244
[58] Field of Search ........... 423/235, 236, 239, 242 R, 423/242 M, 244

[56] References Cited

U.S. PATENT DOCUMENTS 4,141,959  2/1979  Kato et al. ..................... 423/239 A

FOREIGN PATENT DOCUMENTS 55-17041  2/1980  Japan .................................. 423/236

*Primary Examiner*—G. O. Peters
*Attorney, Agent, or Firm*—Haseltine & Lake

[57] ABSTRACT

When exhaust gas from a coal-burning boiler containing NO$_x$ as well as SO$_x$ is subjected to NO$_x$ removal by catalytic reduction of the NO$_x$ with ammonia and the coal ashes contained in the gas are separated, the coal ashes are contaminated by a certain quantity of ammonium compounds produced from the SO$_x$ and the ammonia excessively used. The ammonium compounds in the coal ashes are decomposed into ammonia and a sulfur compound by heating by the hot gas at a temperature in the restricted range, viz. 350° to 700° C., thereby to release ammonia into the gas preferentially to the sulfur compound. The ammonia thus released is recycled to the NO$_x$ removal step.

2 Claims, 2 Drawing Figures

REMOVAL OF NITROGEN OXIDES AND SULFUR OXIDES BY AMMONIA

BACKGROUND OF THE INVENTION

1. Field of the Art

The present invention relates to a method of removing efficiently and economically an ammonium compound contained in coal ashes captured by a dust collector in a system which comprises steps of denitrification (hereinafter referred to as $NO_x$ removal) of an exhaust or flue gas containing coal ashes from a coal-burning boiler, cooling of the gas and dust collection on the gas.

Exhaust gases from coal-burning boiler contain coal ashes or flue dust, an oxide of nitrogen which is called "$NO_x$" hereinafter, and an oxide of sulfur which is called "$SO_x$" hereinafter, and should thus be subjected to dust removal, $NO_x$ removal and $SO_x$ removal treatments. The gases are suitably cooled before being subjected to the treatment or treatments usually by means of heat exchange of the gas with air required for burning coal. Usually, dust removal is conducted by means of, for example, an electric precipitator and $NO_x$ removal is conducted by catalytic reduction of $NO_x$ with ammonia. It is our position that since it is preferable to operate electric precipitator at a relatively low temperature it is preferable to conduct these treatments in the sequence of $NO_x$ removal, cooling, and dust removal. $NO_x$ removal is thus conducted on the exhaust gas still containing coal ashes in high concentration and the dust removal is thus conducted at a lower temperature on the gas which has undergone the $NO_x$ removal by the catalytic reduction of $NO_x$ contained therein with ammonia usually used in a stoichiometrically excess quantity.

In the system which is specifically designed for the steps of the $NO_x$ removal from an exhaust gas containing coal ashes in a high concentration from a coal-burning boiler by introducing it into an $NO_x$ removal unit of the type for catalytic reduction with ammonia, cooling the gas by passing it through a heat exchanger, removing the coal ashes from the gas by passing it through a dust collector such as a low-temperature electrostatic dust precipitator, and thereafter subjecting the gas to $SO_x$ removal by introducing it into a desulfurization unit, a substantial quantity of ammonium compounds such as ammonium sulfate is produced through the reaction of the unreacted or leak ammonia from the $NO_x$ removal unit with the $SO_x$ contained in the exhaust gas and is then put into the coal ashes captured by the dust collector. It is often afraid that such ammonium compounds may very possibly give adverse effects in many ways not only in the handling at the coal ash processing facilities, but also in the disposal or in the recycle use of such coal ashes. The reduction in quantity of such unreacted ammonia from the $NO_x$ removal unit has been attempted somehow on the one hand but under existing circumstances with only unfavorable results attained in the meantime, and essential is thus a prompt countermeasure with respect to the handling of such ammonium compounds on the other.

It is noted that the questioned ammonium compound is typically found in the form of $(NH_4)_2SO_4$ and/or $NH_4HSO_4$ in such coal ashes. Typical methods of removing such forms of ammonium compounds from coal ashes are rinsing or leaching with water and thermal decomposition. With the water-rinsing method, while a high efficiency of removal of such ammonium compounds may be expected for a form of ammonium compound such as ammonium sulfate which is highly water soluble, there is still left the question of restricted use of coal ashes due to its high water content because of the rinsing with water. Moreover, there is another problem such that required is an additional treatment of a large quantity of the waste water produced in the rinsing process which contains substantial quantity of the ammonium compounds leached from the ashes.

The thermal decomposition, on the other hand, has some drawbacks, and is thus not satisfactory, either. The thermal decomposition of the ammonium compounds as mentioned above occurs in the manner represented in the following chemical equations; i.e.,

The thermal decomposition reaction of the ammonium compounds requires that it be conducted at quite a high level of temperature, and consequently, the provision of a heat source has been an essential question to meet in practice. Another possible problem is concerned with disposal of the gas produced from the thermal decomposition step. The gas contains ammonia, and it may thus be easily thought of to recycle the gas to the $NO_x$ removal step thereby to utilize the ammonia as the reducing agent. In view, however, of the fact that the gas can also contain an $SO_x$ such as $SO_3$, the recycle of the gas to the $NO_x$ removal step would result in just a formation of ammonium compounds from the $NH_3$ and the $SO_x$ instead of the use as the reducing agent of the ammonia.

SUMMARY OF THE INVENTION

It is an object of the present invention to provide a solution to these problems.

In accordance with the present invention there is provided an improvement in the process comprising subjecting an exhaust gas from a coal-burning boiler, while the gas contains coal ashes, to a denitrification by means of catalytic reduction of an oxide of nitrogen contained therein with ammonia, and subjecting the denitrified gas to dust removal, the improvement comprising subjecting the coal ashes captured at the dust removal to heating at a temperature of 350° to 700° C. by a solid-gas contact of the coal ashes with an exhaust gas from the coal-burning boiler thereby to decompose an ammonium compound contained in the coal ashes into ammonia and a sulfur compound, which ammonium compound has been produced through the reaction of the unreacted ammonia at the denitrification step with an oxide of sulfur contained in the exhaust gas, whereby the ammonia produced by the decomposition is released into the gas preferentially to the sulfur compound produced by the decomposition, separately the gas containing the ammonia from the coal ashes, and recycling the gas thus separated to the denitrification step.

DETAILED DESCRIPTION OF THE INVENTION

Figure 1:
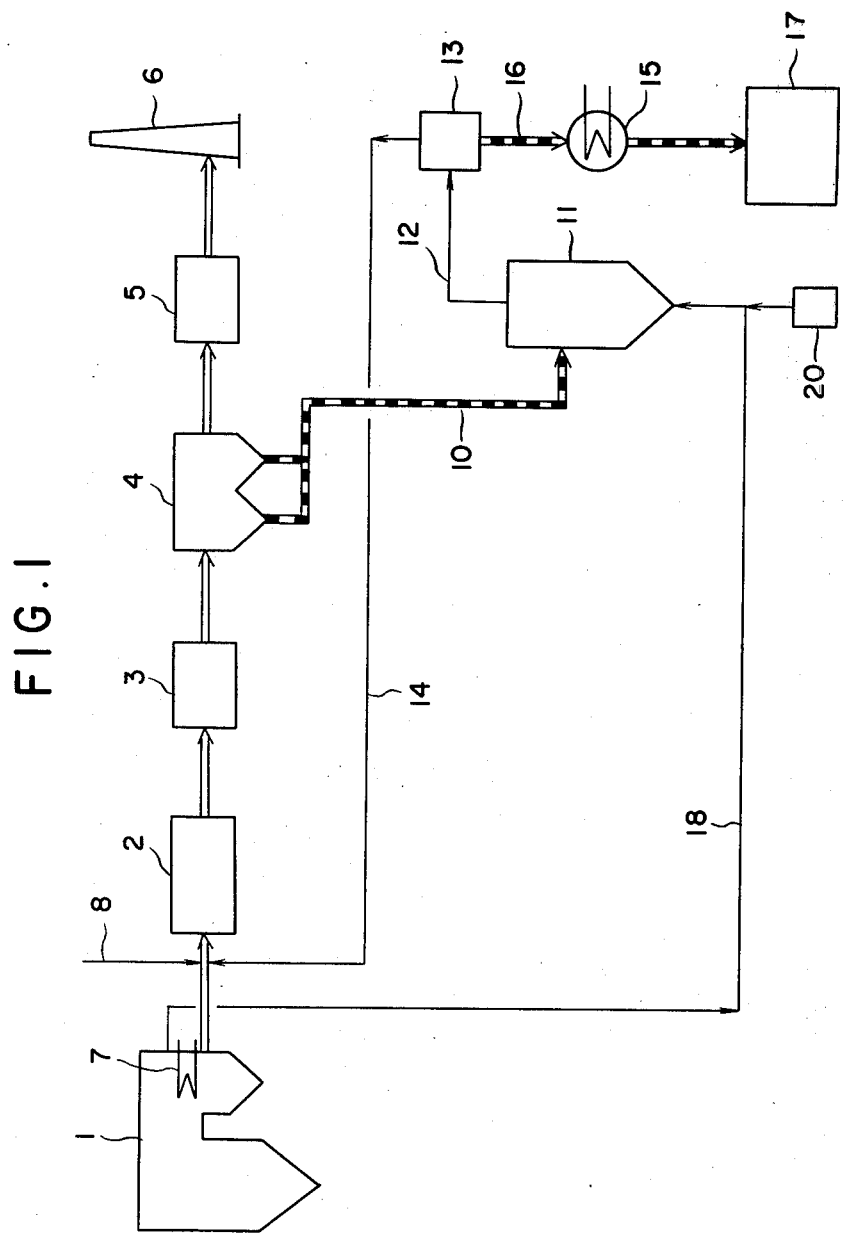
FIG. 1 is a schematic diagram showing generally an example of a system wherein the present invention is reduced to practice.

The present invention will now be described by way of a preferred embodiment thereof as typically shown in the accompanying drawings. Referring to FIG. 1, there is shown generally an example of a system for removing an ammonium compound from coal ashes captured by an electrostatic dust precipitator in which the invention is embodied in practice, and in which there are provided in series a coal-burning boiler 1, an $NO_x$ removal unit 2 for catalytic reduction with ammonia which has a denitrification catalyst charged in position in an exhaust gas duct in the form of a movable bed or a fixed bed, a heat exchanger 3 for cooling the exhaust gas, a dust collector 4 such as an electrostatic dust precipitator, a desulfurization unit 5, and a stack 6. The dust collector 4 may alternatively be of another type such as a filtration type dust collector in which such a grannular filter medium as sand, gravel, ceramics, etc. is charged movably in a space between such carriers as rouvres, metal meshes, punched metal sheets, etc., or a bag type filter. In addition, there are shown an economizer 7 provided within the boiler 1, and an $NH_3$ feed piping provided in the upstream of the $NO_x$ removal unit 2.

Also, there is shown a coal ash-conveying pipe 10 extending from the bottom of the dust collector 4 to a furnace 11 for thermal decomposition of the ammonium compound, and the top of the thermal decomposition furnace 11 is connected operatively through a gas conduit 12 to a solid-gas separator 13 which comprises either a multicyclone or a bag filter, or the combination of these two. The top of the separator 13 is connected through another gas conduit 14 to the upstream of the $NO_x$ removal unit 2, while the bottom of the separator 13 is connected through a coal-ash conveying pipe 16, then to a cooler 15 and further to a coal ash treating facility 17. On the other hand, there is a hot exhaust gas pipe 18 connected to the upstream or the downstream of the economizer 7 of the boiler, which exhaust gas pipe is connected in turn to the bottom of the decomposition furnace 11. For this decomposition furnace 11, a fluidized bed, a transportation bed or a spouted bed may equally be adapted although the spouted bed is preferable. In this system, particularly when the exhaust gas temperature is found to be too low, the system may be rearranged by connecting an auxiliary heating furnace 20 to the exhaust gas pipe 18 so that the gas temperature can be made higher to a desired level.

According to this particular arrangement as stated above in which the exhaust gas from a coal-burning boiler is processed, coal ashes captured by the dust collector 4 is pneumatically transported to the thermal decomposition furnace 11. While the pneumatic transportation of coal ashes may optionally be practiced either by pressure feed or by suction feed, it is preferred to employ the pressure feed type. In this particular arrangement, it is the specific aspect of this invention to introduce hot exhaust gas, for instance, as from the upstream of the coal economizer of a coal burning boiler 1 into the thermal decomposition furnace 11, as a heat source therefor, for the purpose of effecting desired thermal decomposition of the ammonium compound at the temperature ranging from 350° to 700° C. The exhaust gas, after having undergone the thermal decomposition, is then forwarded to the separator 13 to separate the gas from the coal ashes, and the gas containing ammonia and free of the coal ashes is recycled to the $NO_x$ removal unit 2 so as to utilize the ammonia. The coal ashes separated at the separator 13 is cooled by the cooler 15 and is then forwarded to the facility 17 for further treatment.

Figure 2:
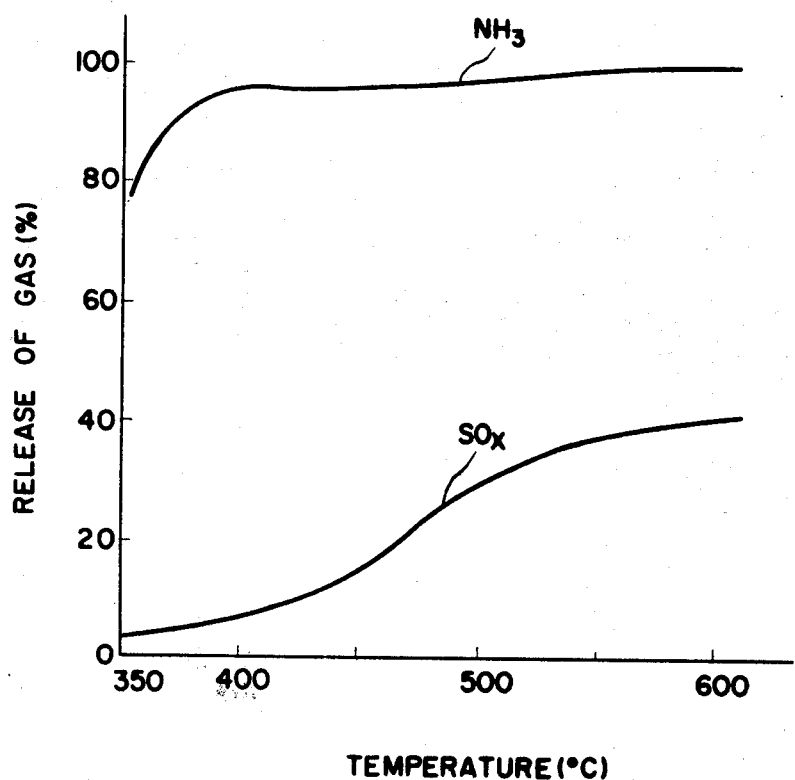
FIG. 2 is a graphic representation showing the relation of a thermal decomposition temperature of the ammonium compound with releases of $NH_3$ and $SO_x$ into the gas from the solid in the thermal decomposition reaction according to this invention.

Referring now to FIG. 2, there is shown the relation between the thermal decomposition temperature and the releases of $NH_3$ and $SO_x$ into the gas. Release of $NH_3$ and release of $SO_x$ mean the ratio in percent of $$\frac{NH_3 \text{ released into a gas phase}}{NH_3 \text{ fixed in a solid phase to be decomposed}} \text{ and}$$

$$\frac{SO_x \text{ released into a gasphase}}{SO_x \text{ fixed in a solid phase to be decomposed}},$$

respectively. The data were obtained by heating by means of an electric furnace in an open porcelain pot of a sample of coal ashes containing 420 mg/kg of fixed ammonia in the solid phase for 1 hour at a given temperature and determining the quantity of $NH_3$ or $SO_x$ released into the gas phase and the quantity of $NH_3$ or $SO_x$ still fixed in the solid phase.

The data set forth in Table 2 show that the release of $NH_3$ is substantially at a constant high level when the decomposition temperature is 350° C. or higher. The release of $SO_x$, on the other hand, is low when the decomposition temperature is between 350° to 500° C., but is increased to a certain level when the decomposition temperature is increased over 500° C. The thermal decomposition of the ammonium compound is carried out in accordance with the present invention, at a temperature of 350° to 700° C., but it is preferable from the result set forth in Table 2 that the decomposition of the ammonium compound contained in the coal ashes be effected at a temperature of 350° to 500° C. in order to make the best of the great difference in the release of $NH_3$ and the release of $SO_x$ into the gas.

The thermal decomposition of the ammonium compound contained in the coal ashes is preferably conducted by means of a spouted bed apparatus in which the coal ashes are fed from an inlet provided at the lower side of a vertically elongated chamber and are kept fluidized by a jet of hot gas blown into the chamber at its bottom. A portion of the hot gas may be introduced into the chamber from an additional inlet provided at the lower side of the chamber. The rates of introduction of the coal ashes and the hot gas are selected so that a desired residence time which is, for example, in the order of a few or several seconds or shorter in the chamber of the coal ashes is secured before they are carried away by the hot gas from the top of the chamber.

The catalytic reduction of $NO_x$ in exhaust gases with $NH_3$ as a reducing agent per se is known in the art. Reference is made to, for example, the Proceedings of the Second $NO_x$ Control Technology Seminar given by Electric Power Research Institute, U.S.A., on Nov. 8 to 9, 1978 in Denver, Colo., U.S.A.

As fully described hereinbefore, according to the improved method of this invention, it is feasible in practice to reuse the gas from the thermal decomposition furnace as a source of $NH_3$ supply, and to utilize hot exhaust gas produced within its own system without any need for an additional source of heat for the thermal decomposition reaction thereby realizing a substantial energy saving within a closed system. Further, as there is substantially no influence upon waste gas treating technique such as an increase in the quantity of gas to be treated or the like, there is afforded an advantageously stable treating operation on the exhaust gas from a coal burning boiler facility.

What is claimed is:

1. In a process for removing nitrogen oxides from sulfur oxides and ash containing exhaust gases from a coal-fired boiler by catalytic reduction followed by removal of the ash and ammonium-sulfur compounds from the gas, the improvement comprising contacting the ash containing ammonium-sulfur compounds with exhaust gas from said boiler at a temperature of 350° to 700° C. whereby the ammonium-sulfur compounds are decomposed, the sulfur compounds are preferentially retained in the ash and the ammonia containing exhaust gas is passed to said catalytic reduction.

2. The process as claimed in claim 1 in which the temperature at which the coal ashes are heated in 350° to 500° C.